Patented June 20, 1933

1,914,903

UNITED STATES PATENT OFFICE

WILLIAM HUNTER VOLCK, OF WATSONVILLE, CALIFORNIA, ASSIGNOR TO CALIFORNIA SPRAY-CHEMICAL CORPORATION, OF SAN FRANCISCO, CALIFORNIA, A CORPORATION OF DELAWARE

PROCESS OF STIMULATING OR REJUVENATING PLANTS AND COMPOSITION FOR USE THEREIN

No Drawing.        Application filed November 15, 1929.    Serial No. 407,565.

My invention relates to a process of stimulating or rejuvenating plants and to a novel combination and proportion of elements or components in a spray to produce this effect.

It has long been supposed that petroleum oils, which having by their fumes some sort of injurious action on insects (e. g. those insect parasites infesting plants), were necessarily injurious to foliage of plants, and even to the stems, particularly the root crowns and upper side of branch sockets. As described in my United States Patent No. 1,707,465, filed September 18, 1923, I discovered that the effective insecticidal power of oils was related to their non-volatility rather than to their vapors and further that the injury to plants was related to impurities, e. g. unsaturated bodies, acids, alcohols, sulfur and also (U. S. Patent No. 1,707,468, filed September 8, 1926) certain unstable substances particularly susceptible to oxidation, light and heat. These discoveries I applied to the production of effective parasiticidal sprays of purified oils, generally emulsified in water with suitable emulsifying agents. Even 5% or 10% of oil in such emulsions of purified oils may be applied even as quick breaking emulsions (U. S. Patent 1,707,466, filed September 17, 1925) with safety to the plant and with excellent insecticidal effect. I also discovered and disclosed that better distribution and penetration of the pure viscous non-volatile oils could be obtained by diluting them with relatively volatile oils, which latter did not have to be of equally great purity if their impurities were likewise volatile and did not linger long enough in contact with the plant to cause injury thereof.

In U. S. Patent 1,707,465, filed September 18, 1923, I referred to the phytotonic action of certain substances which seemed to exercise a beneficial action on the growth and functioning of plants.

I have now made the astonishing discovery that not only do certain drugs affect plants, but the oils themselves may have a peculiar beneficial effect upon many kinds of plants, if applied in proper oil admixtures and aqueous dispersions.

At first great difficulty was experienced in adjusting the conditions of mixing these oils and water to secure such effects, but I have now discovered that, when this is properly done, many plants show a clear and very pronounced increase in fruitfulness amounting in some cases to overbearing which has continued for a long period of time following treatment and in some cases non-bearing or forest type trees have been caused to fruit abundantly. It seems, therefore, that the analogous action of substances upon plant life and upon animal life is much more widespread than has been supposed. Thus it is recognized that growth of hair upon man and some other animals can be promoted by the application of petroleum products to the skin. While a naturally heavy hair growth has been regarded as an indication of virility, it has never been supposed that the forced growth of hair was in any way connected with virility. The action of petroleum on plant life, however, seems to be directly so manifested.

When I first tried pure viscous non-volatile oils, I observed indications pointing to the possibility that they had some beneficial action. I then tried the undiluted and unemulsified oil itself upon the plants. When this oil was moderately volatile, even this did not seem to damage the plants if the oil was highly purified but, on the whole, it showed little or no reliable tonic effect on plants already free from parasites. Nevertheless, when sprayed on as an emulsion I thought the effect was observable. I now know that in the former case the excess of undiluted oil suppressed the stimulating action.

A purified kerosene was then tried and showed very marked penetrating power, completely filling the intercellular spaces of the leaves and also entering the various layers of bark tissue. Such applications, however, frequently resulted in injury, killing the spongy bark of the trunk where larger limbs branched off and also killing the bark about the root crown when the oil drained below the surface of the ground, and was longer retained. It developed, however, that there were two kinds of stimulation; one stimulation of the fecundity in flowering and setting of fruit, the other in general vegetative growth without stimulation of fecundity.

Examination of this kerosene showed it to contain about 10% of unsaturated bodies and only minute traces of sulfur so a specially purified 100% saturated kerosene was prepared and tried. The injury was less marked than before and was practically negligible on leaves and small branches when the less porous tissue allowed the oil to evaporate in a few hours, but the thick porous bark where the mixture gathered and evaporated but slowly still showed some injury. On the other hand, such trees as escaped serious injury by the above treatments showed a very marked increased in fruitfulness, sometimes being over laden with fruit, and the effect continued for sometime. However, the danger of injury was too great to make such treatment practical with our present knowledge and skill in practical methods of applying sprays.

It appeared that the portion of the pure liquid petroleum which could be actually taken up and absorbed by the plant tissues was highly beneficial. I believe, however, that with too great penetration and saturation of porous bark, the excess not taken up produced vapors which collected in the cracks and crevices of the bark and produced a sort of gaseous asphyxiation, possibly by too prolonged exclusion of necessary air.

I then discovered that injury might be almost wholly avoided and the plant still be largely stimulated by admixture of pure non-volatile oil with the volatile stimulant decreasing both the rate of penetration and the partial vapor tension of the volatile kerosene, if the two were properly proportioned to one another. I believe that a very thin film of liquid non-volatile oil permits the transfusion of oxygen which dissolves in it, whereas the vapor of the more volatile hydrocarbons actually expels the oxygen and the water vapor from the crevices, possibly even dehydrating the tissue as though they were in a partial pressure vacuum. Certain it is that I find admixture of the pure viscous non-volatile oil exercises a shielding or protective action against the injurious effect of kerosene on plant tissues.

Another way of preventing or decreasing the injurious action which I believe the excessive asphyxiating action of the vapors to produce, is by using this beneficial mixture of penetrating volatile oil and non-volatile coating oil together with a suitable proportion of water. The water, I believe serves to swell and tighten the heavy bark of the trunk and larger limbs, thereby preventing excessive oil penetration and may also, in its evaporation, either dilute the injurious vapors and sweep them out of the crevices or temporarily lock the volatile oil up in the form of emulsified globules of oil until it is partially or wholly absorbed by the plant tissues.

Thus by suitably adjusting the proportions of well purified volatile and non-volatile components of mineral-oil and of water in which these are emulsified, I have discovered a new method of treating plants which markedly stimulates their bearing activity.

This has worked excellently on orange and lemon trees, as well as on various deciduous fruit trees. I have found that effective and safe mixtures range from about 50% oil, 50% water to about 20% oil and 80% water. By regulating the proportion of water to oil, the required penetration of twigs, buds and small branches is secured without excessive penetration of the heavier more porous bark. The root-crown may be easily shielded and protected. I have found also that by regulating the proportion of non-volatile oil to more volatile oil, the penetrating quality of the lighter and more volatile greatly promotes the penetration and insecticidal action of the heavier and more viscous oil while a small amount of the purified viscous non-volatile oil greatly decreases the danger of injurious action by the more volatile penetrating and tonic oil.

By combination of these effects, I discovered it was possible to obtain the most surprising effects by the use of a volatile kerosene fraction of moderate purity and relatively small proportions of non-volatile viscous oils substantially free from phytocidal ingredients blended with suitable proportions of water.

To enable those skilled in plant physiology as well as insecticidal work to practice my invention and obtain its results, as well as to indicate by example more specifically certain types of oils which can be used, I will give two specific examples which, however, are merely illustrative and instructive in this novel art of plant rejuvenation, and are not in any way intended to limit the scope of the invention as expressed in the claims.

For general use on dormant deciduous trees and on lemon trees, and also on healthy orange trees, in moderate climates and in less active seasons, I prefer to use a soap emulsion containing sufficient soap to render the diluted mixture distinctly soapy. An example of such a formula is as follows:

*Emulsifier*

| | |
|---|---|
| Dry whale oil soap | 9 pounds |
| Water to make | 17.75 gallons |
| Ammonia, strong commercial solution | .25 gallons |
| Making a total volume of | 18.00 gallons |

| | Sp. G | Flash | Fire | Viscos. Lt. oil scale | Color | Tar | Carbonaceous residue | Ash | Unsaturated | Pour |
|---|---|---|---|---|---|---|---|---|---|---|
| Pearl | 41° | 125° F. | 150° F. | 425 | +25 | 0 | 0 | 0 | 8% | Very low |
| Eocene | 42° | 140 | 170 | 425 | 25 | 0 | 0 | 0 | 3 | Very low |
| Mineral Seal | 33° | 265 | 350 | +20 Saybolt | 0 | 0 | Trace | Trace | 5 | −30° F. |
| Crystal Oronite | 29° | 320 | 350 | 115 to 120 Saybolt | +25 | Trace | Trace | Trace | −1 | 0° F. |

*Oil mixture*

| | Gallons |
|---|---|
| Kerosene (Pearl oil quality) | 78 |
| Crystal Oronite | 4 |
| Total volume | 83 |

These two liquids are blended together through a circulating force pump with reduced aperture (nozzle) until the entire mass is reduced to a uniform emulsion of 100 gallons total volume.

In use this emulsion is diluted with water so as to give from 20% to 35% actual oil in the mixture.

A convenient and satisfactory dilution is 1 part by volume of a stock emulsion to 2 parts by volume of water. This gives approximately 28% actual oil.

Where the use of soap, even of whale oil soap, is objectionable, since some vegetation is highly susceptible to injury by soap or other particular emulsifying agents, I may use—

*Emulsifier*

| | |
|---|---|
| Casein | 2 pounds |
| Caustic potash | .23 pounds |
| Dry whale oil soap | .50 pounds |
| Water to make a total volume of | 16 gallons |
| Ammonia strong commercial solution | 1 gallon |
| Total volume | 17 gallons |

*Oil mixture*

| | Gallons |
|---|---|
| Kerosene (Pearl oil quality or better) | 73 |
| Mineral Seal oil (carefully purified) | 10 |
| Total volume | 83 |

This emulsifier is blended with oil as described for the first case and the stock emulsion is diluted for use in the same way.

These cases are merely cited as examples, as many other methods of blending and emulsification may give similar results.

The kinds of oil above mentioned are only typical. The names given them are the only ones I know of by which they can be briefly designated. In order to more accurately define the oils which I have mentioned above, I may say that they respond approximately to the following tests:

No additional purification is generally required. Elane oil may be substituted for Pearly or Eocene and Marcol, Wyrol, or Nujol oil may be substituted instead of the Crystal Oronite or Mineral Seal oils, with suitable adjustment of the other proportions, which adjustments are easily determined by trial.

I may also substitute other light or volatile oils if properly purified and blended. In general, the heavier more viscous and non-volatile is the oil, the less will be required. In general also the lighter, less viscous and more volatile is the light oil, the more of it should be used. The more sturdy and vigorous the kind and general condition of the tree, the richer may the emulsion be, but the more care will be needed to avoid over-stimulation.

By regulating the percentage of water the required penetration of the twigs, buds and small branches is secured for different kinds of trees and by using the proper mixture of heavy (non-volatile) oil, refractory forms of insect life are practically exterminated.

With regard to the quality of the oil blends, I find, as above indicated, that a good grade of lamp oil such as Pearl oil (a grade of kerosene manufactured by the Standard Oil Company of California) mixed with 5% to 10% of heavy (non-volatile) white oil, such as Crystal Oronite, or 10% to 20% light (more volatile) white oil, such as Mineral Seal oil, make a satisfactorty insecticidal mixture that controls the physiological effects so that the tendency to fruiting is not too much exaggerated.

The control of refractory forms of insect life has proved quite remarkable; even such forms as conceal themselves under the bark of trees and are otherwise inaccessible to the ordinary spray application, are readily killed, for example, all forms of mealy bugs and bud mites infecting the closed buds of deciduous trees and codling moth larvæ in cocoons under the bark of old apple and pear trees.

The wetting and spreading power of these concentrated oil mixtures is so great that only small amounts are required for thorough coverages as compared with the 1% to 8% emulsions now generally used. It is possible to obtain complete coverage with 1/3 or less the number of gallons now generally used per tree, thereby largely offsetting the greater cost of the mixture.

Lemon and orange trees sprayed with these mixtures have invariably shown pronounced increased fruitfulness, and certain types found scattered through most orchards, known as non-bearing or forest tree types, have been caused to fruit abundantly.

While I have been as explicit as possible in this wholly new art of rejuvenating vegetable life, particularly since it involves not only the variable conditions of the plant, and the climate, but also the considerable and little-known chemical variations of the natural and artificially modified petroleum products, I do not intend to limit myself thereby. In view of what has been said above, simple experiment will enable any one skilled in handling such materials and familiar with plant physiology, to develop a wide variety of oil plant stimulants. In general, it will be possible to select almost any volatile oil, determine by test and observation if it has a sufficiently high penetrating quality and, if so, it may be thoroughly purified from phytocidal ingredients and tested with varying proportions of the thoroughly pure viscous non-volatile oil emulsified with agents well known to be safe for the particular plants to be treated in varying proportions of water, noting the effect of each proportion and treatment. Permissible degrees of lesser purification can then be ascertained by experience with a view to commercial economy.

I claim:

1. A phytonomic plant fruiting-stimulant comprising less than 1/4 of viscous non-volatile mineral oil, and more than about 3/4 of volatile quickly penetrating mineral oil.

2. A phytonomic plant fruiting-stimulant emulsion comprising less than 1/4 of viscous non-volatile mineral oil, and more than about 3/4 of volatile quickly penetrating mineral oil and water sufficient to form a stable emulsion.

3. A phytonomic plant fruiting-stimulant spray comprising a viscous non-volatile mineral oil and a volatile quickly penetrating mineral oil, and between about 50% and 85% of water.

4. A phytonomic plant fruiting-stimulant comprising about 4% of viscous non-volatile mineral oil, and about 26% of volatile highly penetrating mineral oil and about 70% water.

5. A phytonomic plant fruiting-stimulant comprising between about 1% and 7% of viscous non-volatile mineral oil, between about 16% and 27% of volatile mineral oil and between about 66% and about 83% of water.

6. The process of stimulating the fruiting of plants which consists in applying thereto an aqueous dispersion containing more than 20% of a mixture of a non-volatile evaporation retarder and a volatile phytonomic diluent, the latter constituting more than about 4/5 of said mixture.

7. The process of stimulating the fruiting of plants which consists in applying thereto a mixture comprising less than 1/4 of viscous non-volatile mineral oil, and more than about 3/4 of volatile quickly penetrating mineral oil.

8. The process of stimulating the fruiting of plants which consists in applying thereto an emulsion comprising less than 1/4 of viscous non-volatile mineral oil, and more than about 3/4 of volatile quickly penetrating mineral oil and between about 50% and 85% of water.

9. The process of stimulating the fruiting of plants which consists in applying thereto a mixture comprising a viscous non-volatile mineral oil and a volatile quickly penetrating mineral oil and between 50% and 85% of water.

10. The process of stimulating the fruiting of plants which consists in applying thereto a mixture comprising about 4% of viscous non-volatile mineral oil, and about 26% of volatile highly penetrating mineral oil and about 70% water.

11. The process of stimulating the fruiting of plants which consists in applying thereto a mixture comprising between about 1% and 7% of viscous non-volatile mineral oil, between about 16% and 27% of volatile mineral oil and between about 66% and about 83% of water.

WILLIAM HUNTER VOLCK.